United States Patent
Waters

[11] 3,875,683
[45] Apr. 8, 1975

[54] INTEGRAL HEATER PLENUM DRYING HOPPERS

[75] Inventor: Charles E. Waters, Barrington, Ill.

[73] Assignee: Whitlock, Inc., Farmington, Mich.

[22] Filed: May 17, 1974

[21] Appl. No.: 470,847

[52] U.S. Cl. .................. 34/174; 34/160; 34/177
[51] Int. Cl. ............................. F26b 17/12
[58] Field of Search ............ 34/10, 57 R, 168–178, 34/219, 164, 165, 166, 167, 64; 432/58, 15

[56] References Cited
UNITED STATES PATENTS

| 2,212,120 | 8/1940 | Kneale et al. | 34/10 |
| 2,490,097 | 12/1949 | Seaman et al. | 34/174 |
| 2,916,831 | 12/1959 | McCosh | 34/174 |
| 3,058,236 | 10/1962 | Lassiat | 34/168 |
| 3,337,969 | 8/1967 | Maus | 34/174 |

Primary Examiner—Kenneth W. Sprague
Assistant Examiner—James C. Yeung
Attorney, Agent, or Firm—Kinzer, Plyer Dorn & McEachram

[57] ABSTRACT

A plenum drying hopper for reducing the moisture content of a granular resin material to a predetermined level suitable for molding or other processing, including heating means disposed within a plenum chamber to heat a drying gas to a predetermined temperature immediately prior to introduction of the gas into contact with the granular resin material.

10 Claims, 3 Drawing Figures

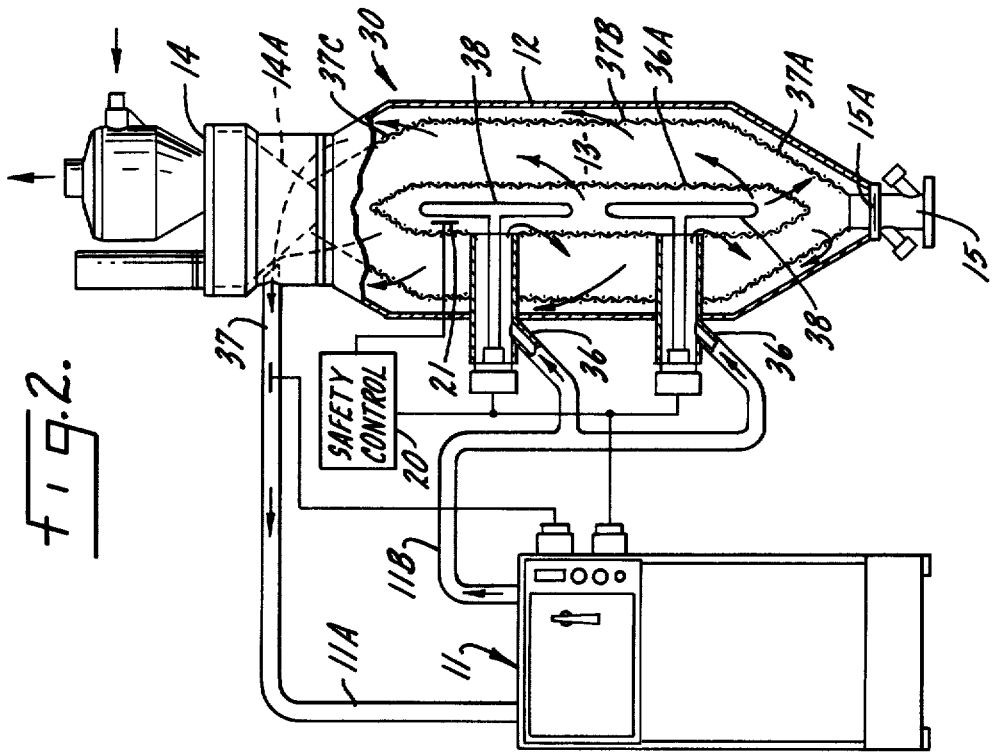
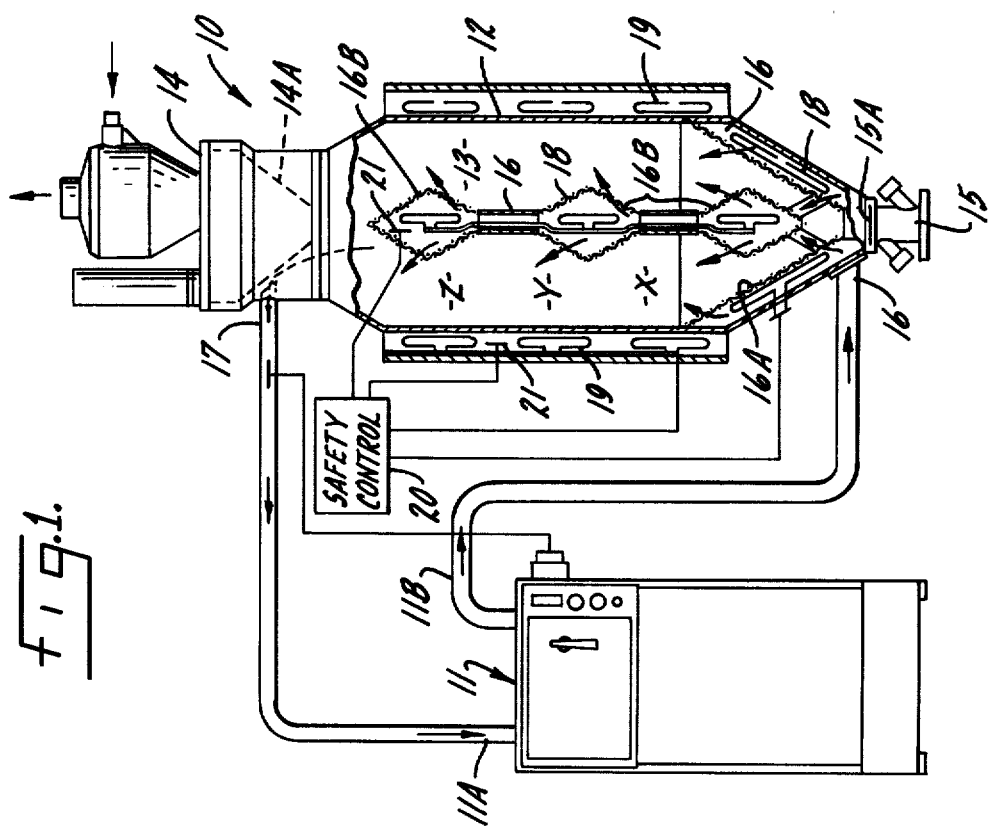

INTEGRAL HEATER PLENUM DRYING HOPPERS

BACKGROUND OF THE INVENTION

This invention relates generally to plenum drying hoppers for granular resin materials used in plastic molding and similar processing. More particularly, the invention concerns a plenum drying hopper which operates by maintaining the drying air at a predetermined substantially constant temperature throughout the drying chamber rather than maintaining the drying air ar a particular point level.

Many granular resin materials are hygroscopic or at least include substantial quantities of entrained moisture. These materials must be dried to extremely low levels of moisture content before use in extrusion molding or other processes. For example, in extrusion molding techniques, some of the monomeric resinous materials utilized are hygroscopic and have a water content of over 0.2 percent, whereas the molding process requires materials with a water content of 0.08 percent or less.

The size and cost of a drying hopper is directly related to the time it requires to dry the material to a given water content. For a molding machine that uses 100 pounds of material in an hour, the drying hopper must accomodate 200 pounds of plastic if the drying time to reach the required level is 2 hours. On the other hand, if the hopper takes 8 hours to reduce the water content to the required level, then the hopper for the same machine must have a capacity of 800 lbs. of the material.

In the past, plenum drying hoppers have been constructed which introduce a drying gas, usually air, into the bottom of a plenum chamber and exhaust the gas from the top of the plenum chamber. The material to be dried enters from the top and is withdrawn from the bottom of the plenum chamber. These devices have utilized extremely dry air, as measured by a low dew point, for introduction into the plenum chamber; a low dew point has been considered at least as important as, and perhaps more important than, the drying gas temperature. The low dew point air is introduced at a given temperature. As it travels up through the plenum chamber, the air is cooled by the material and leaves the chamber at a much reduced temperature. It has now been found that the relationship between the dry bulb temperature and the dew point (air dryness), as it affects the drying time of the hopper, is such that the air temperature is considerably more significant than the dew point of the air in determining the required drying time. Accordingly, much shorter drying times are acheived by maintaining a minimum high temperature throughout the plenum chamber, even at a moderate dew point, than by introducing a low dew point air at a high temperature and allowing the temperature to decrease as the air passes through the plenum chamber.

SUMMARY OF THE INVENTION

In accordance with the invention, a plenum drying hopper for reducing the moisture content of a mass of granular resin material to a predetermined level suitable for extrusion molding or like processing includes a housing enclosing a plenum chamber, the housing including an upper material inlet for introducing granular material into the plenum chamber and a lower material outlet for withdrawing granular material from the plenum chamber, a gas inlet passage extending into the plenum chamber, a gas outlet passage spaced from the gas inlet passage for discharging gas from the plenum chamber after the gas has passed through the granular material within the plenum chamber, and a heating means disposed within the portion of the gas inlet passage located within the plenum chamber for heating the gas to a predetermined temperature immediately prior to movement of the gas from the gas inlet passage into the plenum chamber.

BRIEF DESCRIPTION OF THE DRAWINGS

FIG. 1 is an elevation view, partly in cross section, of a plenum drying hopper constructed in accordance with one embodiment of the invention;

FIG. 2 is a partially sectional elevation view of a plenum drying hopper constructed in accordance with a second embodiment of the invention; and, FIG. 3 is a graph showing the relationship of the dew point of the drying air to the dry bulb temperature of the drying air and their effects upon the total drying time necessary to dry granular resin material to a given moisture level.

DETAILED DESCRIPTION OF THE INVENTION

Figure 3:
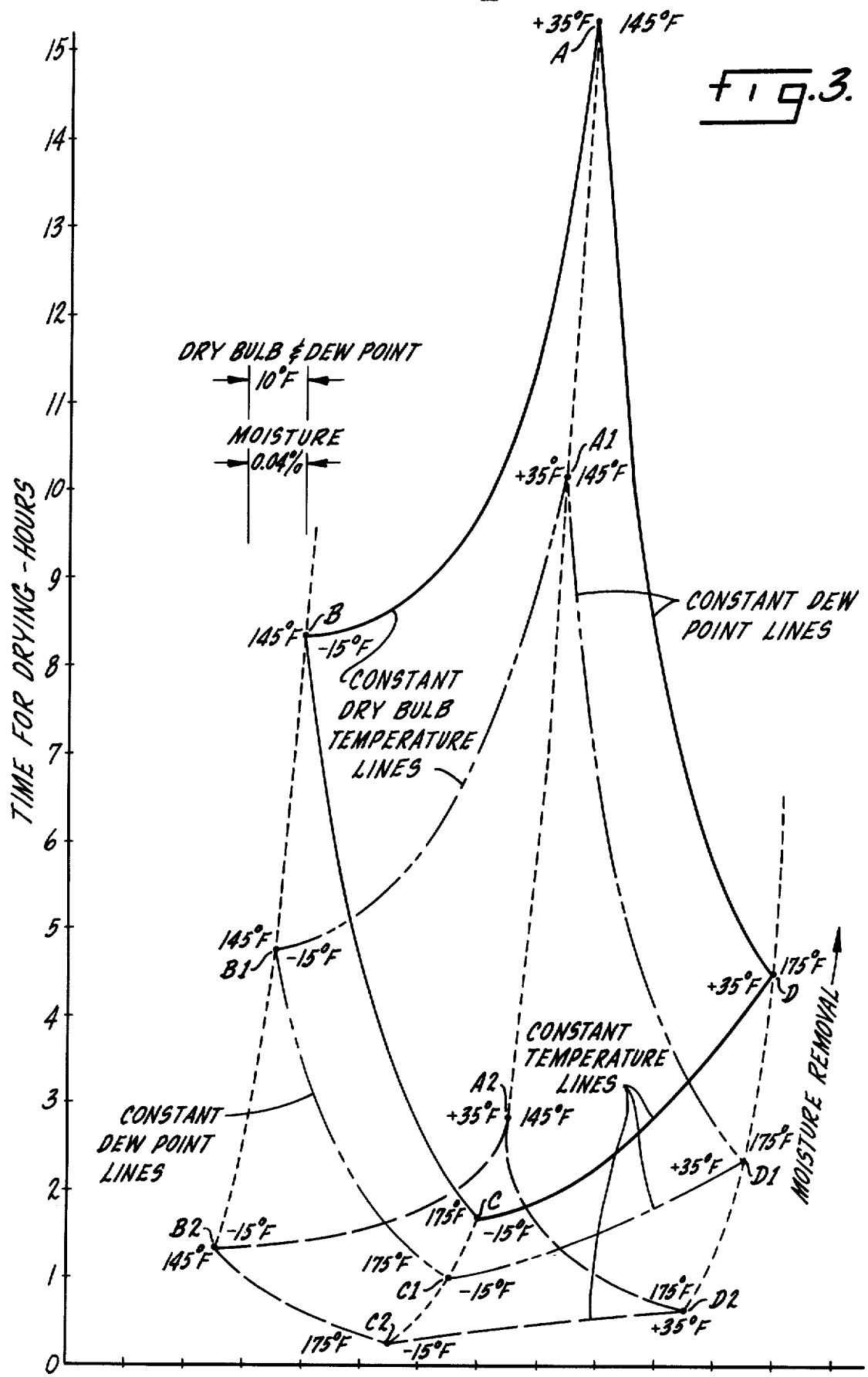

FIG. 1 shows a plenum drying hopper 10 connected to a dehumidifying dryer 11. Dehumidifying dryer 11 may be of any conventional type which will reduce the moisture content of a gas introduced at inlet 11A and produce a dryer gas at the outlet 11B. The dry gas may be warmed or preheated as desired.

Plenum drying hopper 10 is made of a housing 12 enclosing a plenum chamber 13. An upper material inlet 14 and a lower material outlet 15 allow introduction and withdrawal of granular resin material from plenum chamber 13. A gas inlet passage 16 extends into plenum chamber 13 and introduces a dry gas from the dehumidifying dryer 11 into plenum chamber 13. A gas outlet passage 17 is spaced from gas inlet passage 16 and discharges gas from plenum chamber 13 after the gas has passed through the granular material within the plenum chamber. Heating means 18 are disposed within an extension portion of the gas inlet passage 16, located with plenum chamber 13, to heat the gas to a predetermined temperature immediately prior to movement of the gas into plenum chamber 13. Auxiliary heating means 19 may be disposed around the outside of plenum chamber 13.

FIG. 2 shows another plenum drying hopper 30 connected to a dehumidifying dryer 11. Dehumidifying dryer 11 may be of any conventional type which will reduce the moisture content of a gas introduced at inlet 11A and produce a dryer gas at the outlet 11B. The dry gas may be warmed or preheated as desired.

Plenum drying hopper 30 is made of a housing 12 enclosing a plenum chamber 13, the housing including an upper material inlet 14 and a lower material outlet 15 which allow introduction and withdrawal of a granular resin material from plenum chamber 13. Two gas inlet passages 36 extend into plenum chamber 13, being used to introduce a dry gas from the dehumidifying dryer 11 into plenum chamber 13. A gas outlet passage 37 is spaced from gas inlet passages 36 and discharges gas from plenum chamber 13 after the gas has passed through the granular resin material within the plenum chamber. Heating means 38 are disposed within extension portions of the gas inlet passages 36 located within plenum chamber 13 to heat the gas to a predetermined temperature immediately prior to movement of the gas into plenum chamber 13.

In each of FIGS. 1 and 2, material inlet 14 is shown as a vacuum loader cover. However, the material inlet means could be of any other conventional type, such as a manual loader cover. The material to be dried is introduced into the plenum chamber 13 through material inlet 14. An air trap cone 14A allows the material to pass downward and fill the chamber, but does not allow gas to escape through the material inlet 14. Material outlet 15 includes a slide gate 15A which is closed when there is material in the hopper and is opened to allow the material to exit the chamber for use in the extrusion molding press or other processing equipment with which hopper 10 (or hopper 30) is employed. Thus, the entire plenum chamber 13 is filled with the granular resin material to be dried. As resin material is withdrawn through outlet 15, additional material is added through inlet 14, thus maintaining a full plenum chamber 13.

In plenum drying hopper 10 (FIG. 1), the drying gas flows upwardly from inlet 16 through a lower air diffuser cone 16A and into a series of central diverter cones 16B. The cones 16A and 16B are made of a material having small openings which allow the gas to diffuse into the plenum chamber but do not allow the granular resin material to pass into the cones or into inlet passage 16. Thus, heaters 18 heat up the gas within the cones 16A and 16B, which are an extension of inlet passage 16, but never come into contact with the material filling plenum chamber 13. The gas passes outwardly from the diffuser cones 16A and 16B, as shown by the arrows, and passes through the material which fills the plenum chamber and then up and out through the gas outlet passage 17.

Prior plenum drying hoppers have not included central diverter cones such as the central diverter cones 16B; the drying gas has been introduced through a lower diffuser cone like 16A. Moreover, prior devices have not employed heating means such as heater 18, even with a lower diffuser cone. Thus, in prior devices the air temperature decreases as the air travels from the dehumidifying dryer 11 to area X to area Y to area Z and out gas outlet passage 17. Contrarily, in drying hopper 10 the air temperatures at areas X, Y and Z are maintained at approximately constant temperature and similarly the exit air at outlet passage 17 shows only a small temperature drop as compared to the air introduced throughout the plenum chamber via diffuser cones 16A and 16B.

In drying hopper 30 (FIG. 2), gas inlet passage 36 extends into a central diverter cone 36A which is formed of a foraminous barrier which allows the gas or air to diffuse outward into chamber 13 but does not allow the granular resin material to enter the cones or the inlet passages 36. Thus, heating means 38 never comes into contact with the material, but heats the gas within cones 36A immediately prior to its introduction into chamber 13. The gas is diffused, as generally shown by the schematic arrows, into plenum chamber 13 where it drys the material. It then passes to gas outlet passage 37 through a gas collector cone 37A, a side gas collector wall 37B and an upper gas collector cone 37C. Thus, gas outlet passage 37 is connected to a collector passage 37A-37C which surrounds most of the plenum chamber 13 within housing 12. The barrier material which forms gas collector sections 37A, 37B and 37C is again a foraminous material which will allow gas to diffuse through it but will not allow the granular material to pass.

This arrangement of gas inlet passages 36, diffuser cone 36A, collector 37A-37C, and gas outlet passage 37 allows the drying gas to be heated by heating means 38 immediately prior to its introduction into plenum chamber 13, to pass a short distance through the material in the plenum chamber to the gas outlet passage 37, and back to the dehumidifying dryer 11. Again, a substantially constant temperature is maintained throughout chamber 13, since the gas travels only a short distance and is not cooled extensively in that distance.

In another embodiment, flow of gas between gas inlet passage 36 and gas outlet passage 37 could be reversed and heating means 38 be moved from inside central diverter cone 36A to inside the gas outlet passage 37. Similar drying results would be obtained and actually the gas inlet passage would then extend through most of the plenum chamber and surround most of the plenum chamber and the gas outlet passage would extend axially through most of the plenum chamber.

A safety control 20 operates similarly in both drying hoppers 10 and 30 (FIGS. 1 and 2). Temperature sensors 21 are placed at strategic points near the heaters and signal the control unit to interrupt operation of the heaters in case of a malfunction resulting in overheating.

FIG. 3 is a graph showing the relationship of the dew point of the drying air to the dry bulb temperature of the drying air and their effects upon the total drying time necessary to dry granular resin material to a given moisture level. These curves were run with a prior art plenum drying hopper without heaters, in which drying air was introduced into the bottom of the plenum drying hopper from a lower diffuser cone like cone 16A, but containing no heaters. A significant temperature drop occured before the exit of the drying air through an outlet corresponding to outlet 17. The Y axis shows the drying time in hours to reduce the moisture content of the material from 0.2% to the desired level. The X axis shows the dry bulb temperature as Farenheit degrees without a plus or minus sign and also shows the dew point of the air introduced into the plenum chamber as Farenheit degrees with a plus or minus sign in front of it.

For example, at point A, air introduced into the plenum chamber with a dew point of +35°F at a dry bulb temperature of 145°F took about 15 and one-quarter hours to obtain the desired moisture reduction of from 0.2 percent to 0.08 percent. At point B, air with a dew point of −15°F introduced at a dry bulb temperature of 145°F into the plenum chamber took about 8 and one-quarter hours to dry the material to the same moisture level. The curve from A to B maintains the same dry bulb temperature in all applications and varies the dew point of the air introduced from +35°F at A to −15°F at B. At point D, air with a dew point of +35°F introduced into the chamber at a dry bulb temperature of 175°F took about 4½ hours to get the same moisture reduction. As can be seen curve A to D maintains a constant dew point of + 35°F and the dry bulb temperature varies from 145°F at A to 175°F at B. By comparing the curve AB with the curve AD it can be seen that a more significant reduction in drying time can be obtained by increasing the temperature from 145° to 175°F than by decreasing the dew point from +35°F to −15°F. Also by comparison of curve AB to curve AD it can be seen that as point B is approached on curve AB, the beneficial effect of decreasing the dew point becomes minimized since the tangent to the curve becomes almost horizontal, signifying no further decrease in drying time. Conversely, the tangent to curve AD as point D is approached is still significantly vertical, thus indicating that a further increase in temperature would significantly lower the drying time.

Similarly at point C, it is indicated that with air at a dew point of −15°F and a dry bulb temperature of 175°F it took about 1 and three-quarters hours to obtain the same moisture reduction of 0.2 percent to 0.08 percent. The temperature is maintained at 175°F along curve CD while the dew point of the air is varied from −15°F to +35°F. Along curve BC the dew point is maintained constant at −15°F and the temperature is varied from 175°F to 145°F. Comparison of curves CB and CD indicate that if the temperature is allowed to drop slightly it will have a more adverse effect on the drying time than if the dew point is allowed to be increased slightly.

A similar analysis is applicable to points A1, B1, C1, D1 and points A2, B2, C2, D2 with corresponding similarities in dew point temperatures and dry bulb temperatures and corresponding relationships between the associated curves. The differences between the three sets of curves is that A-B-C-D shows the time for a reduction in moisture from 0.2 percent to 0.08 percent. A1-B1-C1-D1 shows the time to reduce moisture from 0.2 percent to 0.10 percent and A2-B2-C2-D2 shows the time to reduce moisture from 0.2 percent to 0.14 percent.

These curves were prepared using a Whitlock dehumidifying dryer, and Whitlock Plenum Drying Hopper. The material dried was nylon 6/6. The superficial velocity of the drying air was forty-eight cubic feet per minute.

The dotted curves B-B1-B2, A-A1-A2, C-C1-C2, and D-D1-D2 show the moisture removal, for instance the moisture level at B2 is 0.14 percent, at B1 is 0.1 percent, and at B is 0.08 percent. Similar levels of moisture occur respectively for points A2 = 0.14 percent, A1 = 0.1 percent and A = 0.08 percent; D2 = 0.14 percent, D1 = 0.1 percent, and D = 0.08 percent; and C2 = 0.14 percent, C1 = 0.1 percent, and C = 0.08 percent.

Accordingly, the plenum drying hoppers of the present invention utilize the principle observed by maintaining the dry bulb temperature as high as possible and substantially uniform throughout the plenum chamber. The temperature drop of the prior art plenum chambers is avoided. Thus, when using a plenum chamber embodying the invention, either the time to dry the granular material can be decreased by using the similar dry air from a dehumidifying dryer as before, or the dehumidifying dryer can produce a higher dew point air while acheiving similar drying times. In either case, the efficiency of drying is increased or the drying time is shortened, both of which are desirable and an improvement over the prior art.

I claim:

1. A plenum drying hopper for reducing the moisture content of a mass of granular material to a predetermined level suitable for processing, comprising:

a housing enclosing a plenum chamber, the housing including an upper material inlet for introducing granular material into the plenum chamber and a lower material outlet for withdrawing granular material from the plenum chamber;

a gas inlet passage, extending into the plenum chamber, for introducing dry gas into the plenum chamber, said gas inlet passage extending through most of the plenum chamber with gas diffusion openings communicating with said plenum chamber throughout the length of said gas inlet passage;

a gas outlet passage, spaced from the gas inlet passage, for discharging gas from the plenum chamber after the gas has passed through or around the granular materail within the plenum chamber; and heating means, disposed within the portion of the gas inlet passage located within the plenum chamber, for heating the gas to a predetermined temperature immediately prior to movement of the gas from the gas inlet passage into the plenum chamber.

2. A plenum drying hopper as in claim 1 including heating elements throughout the gas inlet passage so as to heat the gas immediately prior to its entrance into said plenum chamber.

3. A plenum drying hopper as in claim 2 wherein said heating elements are so arranged to provide the gas entering said plenum chamber at the same temperature throughout the length of said plenum chamber.

4. A plenum drying hopper as in claim 1 including auxiliary heating elements around the outside of the plenum chamber.

5. A plenum drying hopper as in claim 1 wherein said gas inlet passage includes a lower diffuser cone spaced along the bottom of said plenum chamber and a central diverter cone extending axially upwardly through the center of said plenum chamber.

6. A plenum drying hopper as in claim 1 wherein said gas outlet passage extends through most of said plenum chamber.

7. A plenum drying hopper as in claim 6 wherein said gas outlet passage surrounds most of said plenum chamber.

8. A plenum drying hopper as in claim 7 wherein said gas inlet passage extends axially through said plenum chamber.

9. A plenum drying hopper as in claim 1 wherein said gas inlet passage extends through most of the plenum chamber and surrounds most of the plenum chamber and said gas outlet passage extends axially through most of said plenum chamber.

10. A plenum drying hopper as in claim 1 wherein said heating means are disposed so as to provide an approximately constant temperature of the gas within the plenum chamber.

* * * * *